United States Patent [19]
Hinds

[11] 3,851,196
[45] Nov. 26, 1974

[54] PLURAL AXIS LINEAR MOTOR STRUCTURE

[75] Inventor: Walter Edwin Hinds, Los Angeles, Calif.

[73] Assignee: Xynetics, Inc., Canoga Park, Calif.

[22] Filed: Apr. 5, 1973

[21] Appl. No.: 348,008

Related U.S. Application Data

[63] Continuation-in-part of Ser. No. 178,753, Sept. 8, 1971, abandoned.

[52] U.S. Cl.................. 310/12, 318/38, 318/115
[51] Int. Cl. ........................................ H02k 41/02
[58] Field of Search............... 318/115, 135, 687; 310/12–14, 35–37

[56] References Cited
UNITED STATES PATENTS

| | | | |
|---|---|---|---|
| 3,441,819 | 4/1969 | Palmero | 318/115 |
| 3,668,443 | 6/1972 | Schwartz | 310/12 |
| R27,289 | 2/1972 | Sawyer | 318/135 X |
| R27,436 | 7/1972 | Sawyer | 318/135 X |

OTHER PUBLICATIONS

"Linear – Rotary Actuator and Transducer for Stick Printer," IBM Tech. Discl. Bulletin, Vol. 16, No. 2, 7/73, Meier.

*Primary Examiner*—Donovan F. Duggan
*Attorney, Agent, or Firm*—Ellsworth R. Roston

[57] ABSTRACT

A positioning system for providing a controlled relative movement between two members along first and second coordinate axes including first member, such as a magnetic platen, having at least two separate areas and with each area corresponding to a different one of the coordinate axes, and with each area having a different energy configuration such as parallel ridges of magnetic material to provide magnetic energy configurations, and with at least two of the energy configurations disposed relative to each other along the coordinate axes and with a second member, such as a head disposed for movement relative to the first member along the first and second coordinate axes and with the second member including different means, and with each means selective energizable for providing forces between the second member and the first member in cooperation with the individual energy configurations of the separate areas of the first member to provide independent movement of the second member along the coordinate axes.

20 Claims, 7 Drawing Figures

PLURAL AXIS LINEAR MOTOR STRUCTURE

This is a continuation-in-part of application Ser. No. 178,753 filed Sept. 8, 1971, now abandoned, the subject matter of which is incorporated by reference into the present application.

The present invention is directed to a positioning system providing for a controlled relative movement between a head and a platen. The platen may be formed of material such as magnetic material and may have a pattern of spaced upstanding ridges of magnetic material. In a prior art embodiment of the invention the magnetic platen is formed of a single pattern of upstanding teeth of magnetic material to provide for a grid pattern. A head member is located adjacent to the platen and includes corresponding electromagnetic means which, when selectively energized, provide for a magnetic force between the head and the platen to provide a movement of the head relative to the platen. The head may include separate means to provide movement of the head along two coordinate axes relative to the platen. The general type of positioning system described above may be of the type disclosed in the U.S. Pat. Nos. Re. 27,289 and Re. 27,436 listing Bruce A. Sawyer as the inventor and a control system for selectively energizing the head and providing a controlled movement of the head relative to the platen may be seen with reference to copending U.S. application Ser. No. 36,177 listing Bruce A. Sawyer as the inventor.

The present invention is an improvement upon the positioning systems described in the above-referenced patent and patent application and reference is hereby made to these patents and patent application for greater detail as to the particular structure and operation of the head, platen and control system.

The present invention is directed to a positioning system where the platen contains separate areas, each having different energy configurations, such as magnetic configurations, to produce a split platen which has several advantages over the prior art devices described above. The split platen cooperates with separate means in a head member to provide for movement of the head relative to the platen along coordinate axes.

In the positioning system of the present invention, the platen contains separate areas such as parallel ridges of magnetic material and with each area including a plurality of such ridges. If it is desired to provide movement of the head along coordinate axes which are perpendicular to each other, then the parallel ridges in the separate areas would also be perpendicular to each other. The present invention, however, is not limited to the parallel ridges being perpendicular to each other. If the platen is flat, then the parallel ridges in the separate areas would normally be perpendicular to each other. The present invention, however, may be applied to platens which are not flat. For example, the platen may be formed on the outside of a cylindrical member or the platen may be formed as a toroidal or spherical member. Generally, however, the platen does include separate areas, each area having an energy configuration to provide a movement of the head along an axis related to each separate area.

The present invention may also include the platen having spaced areas which have the same energy configuration such as a magnetic pattern and with the head member extending between the spaced areas and including electromagnetic means cooperating with these spaced areas. These spaced areas provide for a movement of the head member when selectively energized along a single axis. The use of such spaced areas produces a high torsional stiffness since these areas are spaced from each other and such high torsional sitffness would normally prevent undesired rotational movements of the head member. The platen may also have a third area which includes a magnetic pattern which is different from the magnetic pattern of the first and second areas so as to provide for movement of the head member along the second coordinate axis.

In another embodiment of the invention, the platen may have pairs of spaced areas and with an open work area positioned intermediate these pairs of spaced areas so as to provide for the head member moving relative to the platen along the coordinate axis while still maintaining an open work area intermediate all of the spaced areas.

The present invention has several advantages over the systems shown in the prior art patents and application. In the present invention, the use of spaced areas having the same magnetic configuration allows for the high torsional stiffness described above. In addition, the use of upstanding ridges of magnetic material provides about twice the force of an equivalent platen which is formed as a grid or waffle, which is a type of system described in the above-referenced patents and application. This force is twice since there is about twice the area of magnetic material since it is necessary to eliminate more magnetic material in forming a waffle pattern. In addition, since the platen is not formed in the waffle pattern, it may be more easily fabricated from a single piece of magnetic material.

The use of this split platen does provide for many different configurations as described above, and a clearer understanding of the invention will be had with reference to the following description and drawings, wherein.

Figure 1:
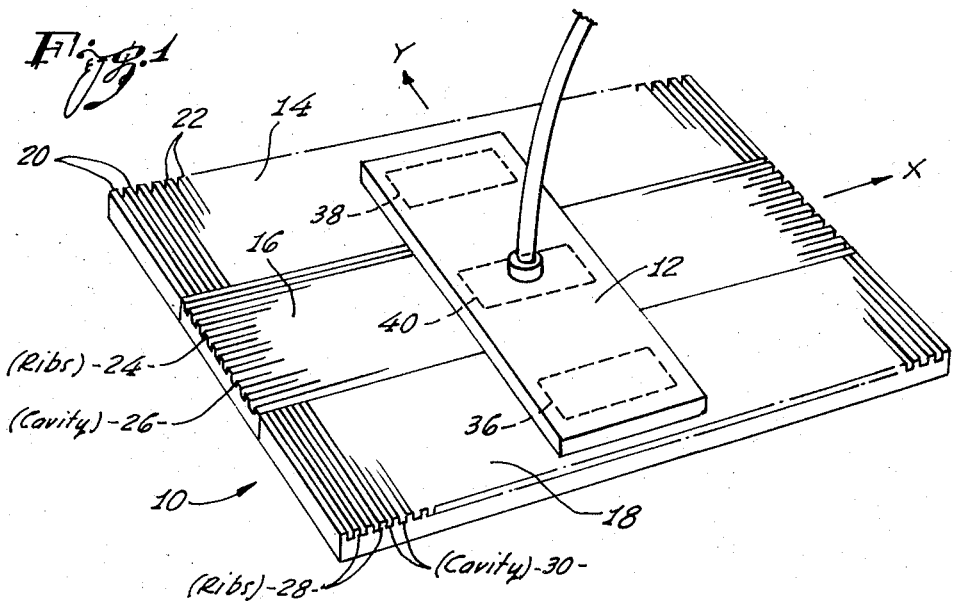
FIG. 1 illustrates a first embodiment of the invention showing a platen having three spaced areas and with a head member positioned above the platen.

In FIG. 1 a first embodiment of the positioning system of the present invention includes a platen 10 and a head 12. The platen 10 is divided into three separate areas, 14, 16, and 18. Each of the separate areas includes a plurality of ridges of magnetic material which are parallel to each other. For example, area 14 includes ridges 20 separated by spaces 22; area 16 includes ridges 24 separated by spaces 26; and area 18 includes ridges 28 separated by spaces 30.

It can be seen with reference to the platen 10 that the platen may actually be composed of a single piece of magnetic material such as soft iron and with the ridges in the separate areas 14, 16, and 18 being formed from this single piece of magnetic material. It can also be seen with reference to FIG. 1 that the areas 14 and 18 have ridges which are parallel and in line with each other and the area 16 includes ridges which are parallel to each other and perpendicular to the ridges of the areas 14 and 18. The areas 14 and 18 provide for an energy configuration or magnetic configuration which is used in cooperation with means located in the head 12 to provide for a movement of the head 12 in an X direction shown by the arrow 32. The area 16 has an energy or magnetic configuration which cooperate with means in the head 12 to provide for a movement of the head 12 in a Y direction, shown by the arrow 34.

Figure 2:
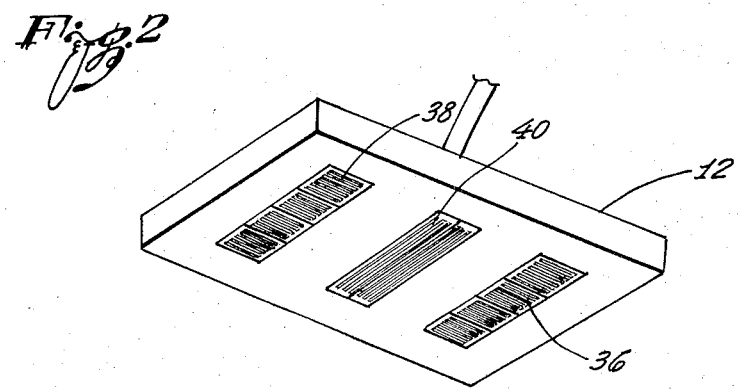
FIG. 2 illustrates the underside of the head member of FIG. 1.

FIG. 2 illustrates the underside of the head member 12 and wherein the head includes a plurality of electromagnetic means to cooperate with the areas 14, 16, and 18 of the platen 10. The head 12 includes a first group of electromagnetic means 36 which cooperate with the area 18 and a second group of electromagnetic means 38 which cooperate with the area 14. The head 12 also includes a third group of electromagnetic means 40 which cooperate with the area 16.

The electromagnetic means 36, 38, and 40 include a plurality of magnetic ridges and windings and with the ridges being aligned at particular times with the ridges of the areas 14, 16, and 18. The interaction of the magnetic fields produced by the electromagnetic means 36, 38, and 40 with the magnetic material of the ridges in the areas 14, 16, and 18 provides for an independent movement of the head member 12 along the X and Y axes in accordance with the selective energization of the electromagnetic means 36, 38, and 40. Specifically, the electromagnetic means 36, 38, and 40 may include groups of ridges which are spaced from each other so that all of the ridges are not aligned with the ridges in the separate areas 14, 16, and 18 at the same times so that upon selective energization of the windings the head is moved. A clearer understanding of the operation of the interaction of the head and platen so as to provide a relative movement between a head and platen may be seen with reference to U.S. Pat. Nos. Re. 27,289 and Re. 27,436. It is to be appreciated that the present invention is directed to an improvement in the configuration of the platen and the particular structure of the head and platen so as to provide for the movement may be in accordance with the structure in the U.S. Pat. Nos. Re. 27,289 and Re. 27,436. In addition, the selective energization of the head member be in accordance with the abovereferenced patents or controlled in a manner as shown in U.S. Pat. application Ser. No. 36,177.

Figure 3:
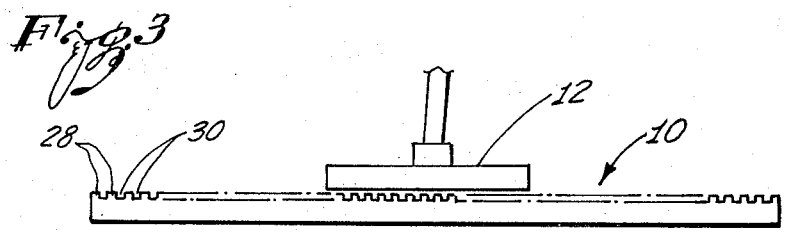
FIG. 3 illustrates a front view of the first embodiment of the invention.

In FIG. 3 it can be seen that the head member 12 is positioned above the platen 10 with an air space therebetween in order to facilitate the movement of the head 12 relative to the platen 10. An air bearing may be used as is described in the prior patents so that the head is essentially floating on a film of air over the platen 10.

Figure 4:
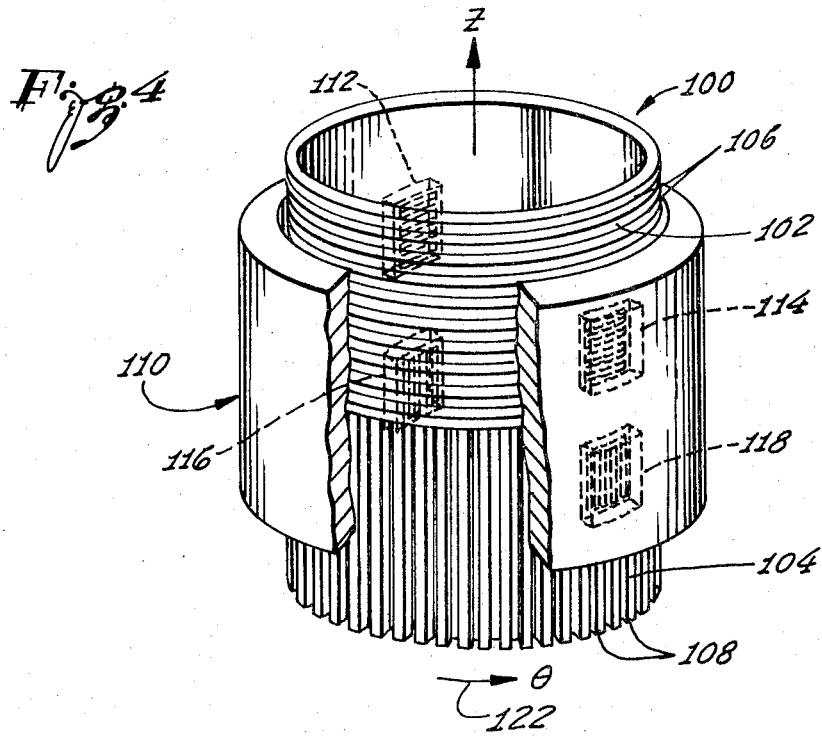
FIG. 4 illustrates a second embodiment of the invention wherein the platen is formed as a right circular cylinder and including two spaced areas cooperating with a head member.

FIG. 4 illustrates a second embodiment of the invention including a cylindrical platen 100 having separate areas 102 and 104. It can be seen that the area 102 includes a plurality of upstanding ridges 106 of magnetic material which extend circumferentially around the cylindrical platen 100. The area 104 includes a plurality of upstanding ridges 108 of magnetic material which are parallel to each other and extend axially along the cylindrical platen 100. The areas 102 and 104 therefore are separate areas having different magnetic energy configurations and which energy configurations are essentially perpendicular to each other.

A head member 110 is cylindrical and slightly larger in diameter than the platen 100. The head member 110 includes first and second electromagnetic means 112 and 114 similar to the means shown in FIG. 1 to provide for relative movement between the head and the platen. The head 110 also includes third and fourth electromagnetic means 116 and 118. The first and second means 112 and 114 cooperate with the first area 102 so as to provide for relative movement between the head 110 and the platen 100 along a Z axis defined by the arrow 120. The third and fourth means 116 and 118 cooperate with the second area 104 so as to provide for a relative rotational movement between the head and the platen along a rotational axes defined by the arrow 122 with the notation $\theta$.

It can be seen, therefore, with reference to the embodiment of FIG. 4, that selective energization of the first, second, third, fourth means, 112-118, provides for a relative rotational and longitudinal movement between the head 110 and the cylindrical platen 100.

Figure 5:
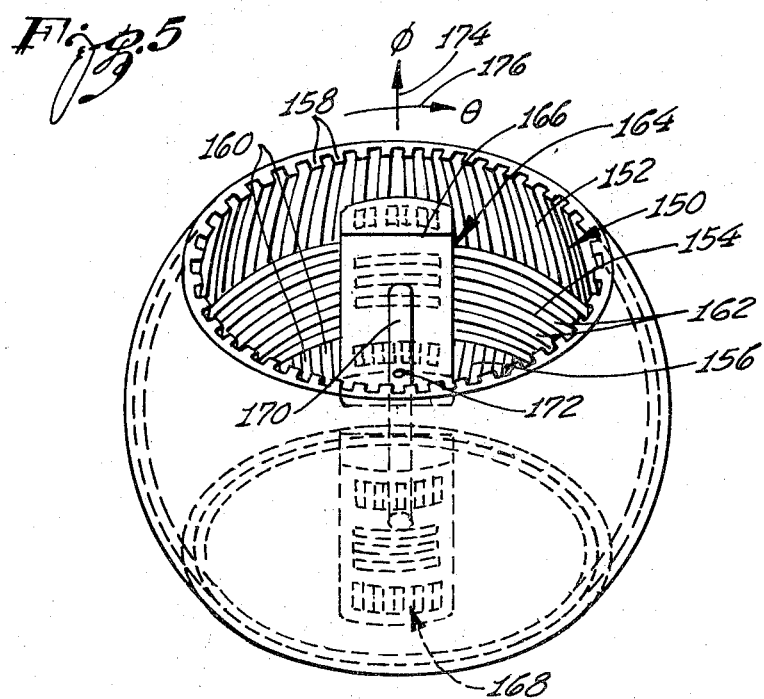
FIG. 5 illustrates a third embodiment of the invention where the platen is formed as a portion of a toroid or a sphere and including three spaced areas.

FIG. 5 illustrates a third embodiment of the invention including a magnetic platen 150 having a toroidal shape, or being a section of a sphere which magnetic platen includes three separate areas 152, 154, and 156. The areas 152 and 156 include parallel ridges of magnetic material 158 and 160 which parallel ridges are along the same line and are used to provide for a magnetic configuration to produce movement along one axis. The area 154 includes parallel ridges of magnetic material 162 which extends circumferentially around the interior surface of the toroidal platen 150 to provide for movement along a second coordinate axis.

A head member 164 includes two portions 166 and 168. The two portions are joined by a bar 170 which may be pivoted about the point 172. Each portion 166 and 168 includes electromagnetic means which are similar to the electromagnetic means shown in FIG. 1 except they extend along a curved surface to conform to the inner surface of the toroidal platen 150. It can be seen therefore, that by selective energization of the electromagnetic means included in the portions 166 and 168 of the head member 164, a relative motion along the two angular coordinate axes shown by the arrows 174 and 176 marked $\phi$ and $\theta$ respectively may be produced. One axis is a rotational axis 176 around the pivot point 172 and the second axis is a rotational axis 176 again, around the pivot point 172.

Figure 6:
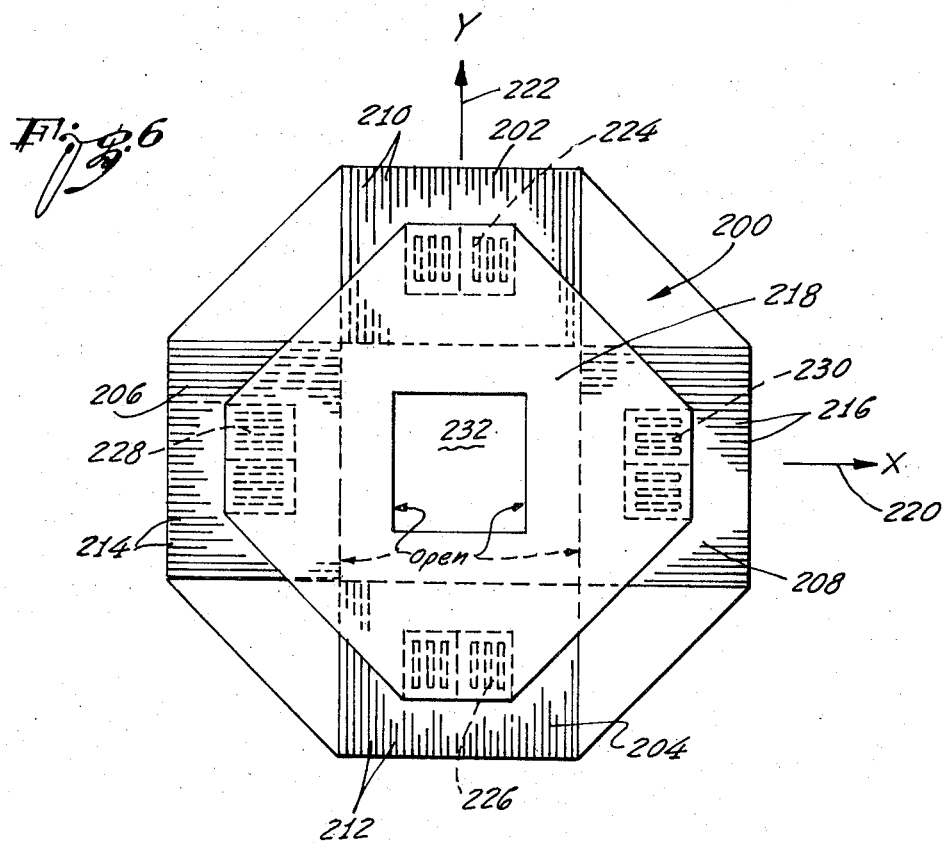
FIG. 6 illustrates a fourth embodiment of the invention where the platen is formed as a flat member having four spaced areas and including an open work area intermediate the four spaced areas.
Figure 7:
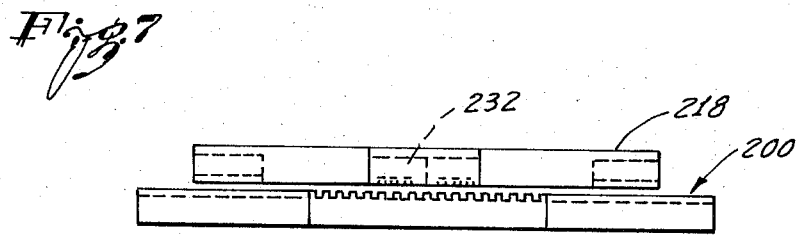
FIG. 7 illustrates a side view of the embodiment of FIG. 6.

FIGS. 6 and 7 illustrate a fourth embodiment of the invention including a magnetic platen 200 having four separate areas 202, 204, 206, and 208. It can be seen that areas 202 and 204 include parallel ridges 210 and 212 which extend in a first direction and areas 206 and 208 include parallel ridges 214 and 216 which extend in a second direction, which direction is perpendicular to the direction formed by the parallel ridges in the areas 202 and 204. Therefore, each group of two separate areas provides for a magnetic energy configuration to produce a relative movement of a head member 218 along coordinate axes which are perpendicular to each other and are represented by the X and Y axes shown by the arrows 220 and 222.

I claim:

1. A positioning system for providing a controlled relative displacement in first and second coordinate directions, including a first member forming a platen having at least two separate areas and with each one of the areas corresponding to a different one of the coordinate axes and with each of the areas being provided with a plurality of first portions defining a first energy level and spaced from one another by second portions defining a second energy level different from the first energy level and with the first and second portions in a first one of the separate areas being spaced from one another along the first coordinate direction and with the first and second portions in the other one of the separate areas being spaced from one another along the second coordinate direction, and a second member disposed relative to the first member for movement relative to the first member along each of the first and second coordinate directions independent of the movement along the other coordinate direction and with the second member including first means disposed in contiguous relationship to the first area of the first member and energizable for producing a first force between the second member and the first portions in the first area of the first member to provide an independent displacement of the second member relative to the first member in the first coordinate direction in accordance with such energizing and with the second member including second means disposed in contiguous relationship to the second area of the first member and energizable for producing a second force between the second member and the first portions of the second area of the first member to provide an independent displacement of the second member relative to the first member in the second coordinate direction in accordance with such energizing.

2. The positioning system of claim 1 wherein the first member includes at least a third separate area spaced from the second area and having first and second portions corresponding to the first and second portions in the second area and spaced from one another in the second coordinate direction in accordance with the spacing between the first and second portions of the second area and with the first area intermediate the second and third spaced areas and with the second member including third means spaced from the second means and with the third means disposed in contiguous relationship to the third separate area and energizable for producing between the second member and the first portions of the third area in the first member a third force corresponding to the second force to provide an independent displacement of the second member relative to the first member in the second coordinate direction in accordance with such energizing.

3. The positioning system of claim 1 wherein the first and second areas of the first member define a planar surface and the second member is displaced relative to the first member in the coordinate directions while being maintained in contiguous relationship to the first member.

4. The positioning system of claim 1 wherein the first and second areas of the first member define an arcuate surface in at least the first coordinate direction and a linear configuration in the second coordinate direction and the second member is angularly displaced relative to the first member in the first coordinate direction while being maintained in contiguous relationship to the first member and is linearly displaced relative to the first member in the second coordinate direction while being maintained in contiguous relationship to the first member.

5. The positioning system of claim 1 wherein the first and second members of the first member define an arcuate surface in the first and second coordinate directions and the second member is angularly displaced relative to the first member along both coordinate directions while being maintained in contiguous relationship to the first member.

6. A positioning system for producing a controlled relative displacement in first and second coordinate directions, including a magnetic platen having at least first and second separate areas spaced from each other, each of the areas controlling movement in a particular one of the coordinate directions and each defined by first portions having a first magnetic strength and second portions spaced between the first portions in the direction of the particular coordinate axis and having a second magnetic strength different from the first strength, and a head positioned adjacent to the platen for movement relative to the platen in the coordinate directions and including first magnetic means disposed adjacent to the first and second portions in the first area of the platen for providing a force between the head and the first area to provide a movement of the head relative to the platen in the first coordinate direction and including second magnetic means disposed adjacent to the first and second portions in the second area of the platen for providing a force between the head and the second area to provide a movement of the head relative to the platen in the second coordinate direction independently of the movement of the head relative to the platen in the first coordinate direction.

7. The positioning system of claim 6 wherein the magnetic platen includes at least a third separate area spaced from the first and second areas and having first and second portions disposed in the same configuration as the first and second portions in the second area and provided with the same magnetic properties as the first and second portions in the second area and wherein the first area is intermediate the second and third spaced areas and wherein the head includes third magnetic means spaced from the second magnetic means and disposed adjacent to the first and second portions in the third area of the platen and wherein the second and third means are constructed and disposed relative to the second and third areas of the platen to produce a force between the head and the second and third areas of the magnetic platen to provide an independent displacement of the head relative to the magnetic platen in the second coordinate direction independently of the movement of the head relative to the magnetic platen in the first coordinate direction.

8. The positioning system of claim 6 wherein the magnetic platen forms a flat surface and the head is constructed to be displaced linearly in each of the coordinate directions while being positioned in adjacent relationship to the platen.

9. The positioning system of claim 1 wherein the magnetic platen forms a curved surface in at least a particular one of the first and second coordinate directions and the head is constructed to be displaced angularly in the particular coordinate direction and to be displaced linearly in the other coordinate direction while being positioned in adjacent relationship to the platen.

10. The positioning system of claim 6 wherein the magnetic platen forms a curved surface in the two coordinate directions and the head is constructed to be angularly displaced in each of the coordinate directions while being positioned in adjacent relationship to the platen.

11. A positioning system providing a controlled relative displacement in first and second coordinate directions, including a platen having at least first and second separate areas controlling displacement in the first coordinate direction and having a third separate area controlling displacement in the second coordinate direction, and each of the first, second and third areas having first portions with particular dimensions in the direction of displacement controlled by such area and having second portions providing the particular spacing of the first portions from one another in the direction of displacement controlled by such area, the third area being disposed between the first and second areas in the direction of displacement provided by the third area, the first portions in each area having a different energy level than the second portions in that area, and a head positioned adjacent to the platen for displacement relative to the platen in the first and second coordinate directions and including first and second means respectively disposed relative to the first and second areas of the platen and constructed to provide a force between the head and the respective ones of the first and second areas to provide a displacement of the head relative to the platen in the first coordinate direction and including third means disposed relative to the third area of the platen and constructed to provide a force between the head and the third area to provide a displacement of the head relative to the platen in the second coordinate direction.

12. The positioning system of claim 11 wherein the platen includes a fourth separate area having first and second portions corresponding in construction and disposition in the second direction to the construction and disposition of the first and second portions of the third area and further includes fourth means disposed relative to the fourth area of the platen to provide a force with the third means between the head and the third and fourth areas to provide a displacement of the head relative to the platen in the second coordinate direction.

13. The positioning system of claim 12 wherein the first and second areas are spaced from each other in the second coordinate direction and the third and fourth areas are spaced from each other in the first coordinate direction to provide an open area intermediate the first, second, third, and fourth areas.

14. The positioning system of claim 11 wherein the platen forms a flat surface and the head is constructed to be displaced linearly in each of the first and second coordinate directions relative to the platen while being positioned in adjacent relationship to the platen.

15. The positioning system of claim 11 wherein the platen forms a curved surface in a particular one of the first and second directions and the head is constructed to be displaced angularly in the particular one of the coordinate directions and linearly in the other one of the coordinate directions relative to the platen while being positioned in adjacent relationship to the platen.

16. The positioning system of claim 11 wherein the platen forms a curved surface in each of the two coordinate directions and the head is constructed to be displaced angularly in each of the coordinate directions relative to the platen while being positioned in adjacent relationship to the platen.

17. A positioning system providing a controlled relative displacement in first and second coordinate directions, including a flat magnetic platen having at least first and second spaced separate areas controlling relative displacement in the first coordinate direction and a third separate area controlling relative displacement in the second coordinate direction, each of the first and second areas having first magnetic portions with uniform dimensions and with uniform spacings in the first coordinate direction and having second magnetic portions in the uniform spacings in the first coordinate direction and each of the third areas having first magnetic portions with uniform dimensions and with uniform spacings in the second coordinate direction and having second magnetic portions in the uniform spacings in the second coordinate direction, the first magnetic portions in each of the first, second and third areas having different magnetic properties than the second magnetic portions in the corresponding one of the first, second and third areas, and a head positioned adjacent to the magnetic platen for movement relative to the platen along the first and second coordinate axes including first and second electromagnetic means disposed adjacent to the first and second magnetic portions in the first and second areas respectively, and constructed to provide a magnetic force between the head and the respective ones of the first and second areas to provide a displacement of the head relative to the platen in the first coordinate direction and including third electromagnetic means disposed adjacent to the first and second magnetic portions in the third area to provide a magnetic force between the head and the third area to provide a displacement of the head relative to the platen in the second coordinate direction.

18. The positioning system of claim 17 wherein the third area of the magnetic platen is located intermediate the first and second areas and wherein the first portions of each of the magnetic areas are defined by a plurality of parallel ridges of magnetic material and wherein the ridges of magnetic material in the first and second areas are perpendicular to the ridges of magnetic material in the third area.

19. The positioning system of claim 17 wherein the magnetic platen includes a fourth separate area having first and second magnetic portions corresponding in construction and in disposition in the second coordinate direction to the first and second magnetic portions in the third area and wherein the head includes fourth electromagnetic means disposed adjacent to the first and second magnetic portions in the forth area on the platen and constructed to provide a magnetic force between the head and the fourth area to provide a displacement of the head relative to the platen in the second coordinate direction.

20. The positioning system of claim 19 wherein the magnetic platen includes an open work area intermediate the first and second areas and intermediate the third and fourth separate areas and wherein the head extends across the open work area to the first, second, third and fourth areas.

* * * * *